Jan. 19, 1943.   R. CHELBORG   2,308,646
AUTOMATIC DESURFACING MACHINE
Filed July 8, 1941
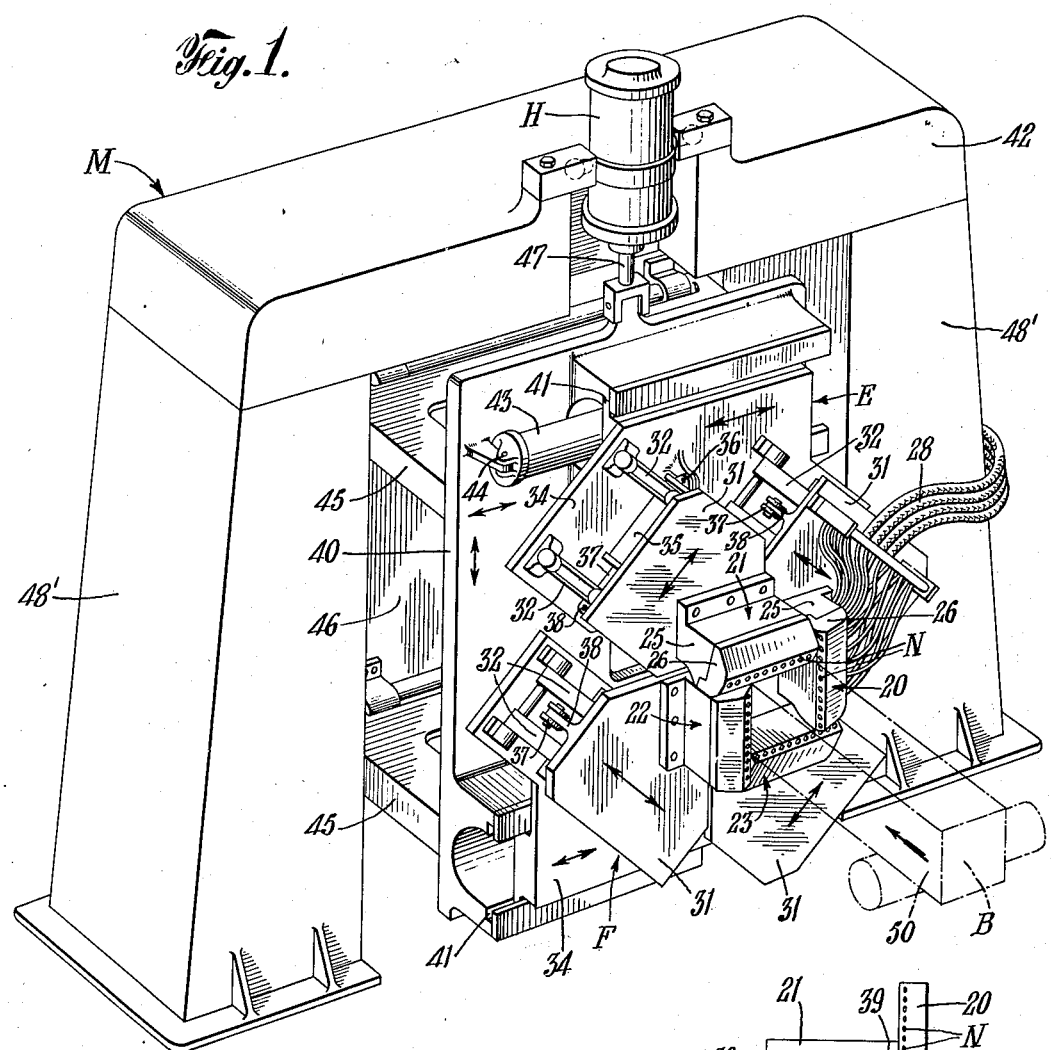
INVENTOR
RUDOLPH CHELBORG
BY
ATTORNEY Patented Jan. 19, 1943

2,308,646

UNITED STATES PATENT OFFICE 2,308,646

AUTOMATIC DESURFACING MACHINE

Rudolph Chelborg, Maplewood, N. J., assignor to The Linde Air Products Company, a corporation of Ohio Application July 8, 1941, Serial No. 401,449

9 Claims. (Cl. 266—23)

This invention relates to the art of conditioning the surfaces of metal bodies and more particularly to apparatus for thermochemically desurfacing ferrous metal bodies such as billets, blooms, slabs and the like and to apparatus for thermally removing scale from such bodies.

During the casting of steel ingots and during the rolling of steel shape, defects such as scale, cracks, seams and the like form on and in the surfaces of the bodies. In order to reduce the number of rejections of the finished products, it is desirable to condition such semi-finished bodies to remove such defects. Desurfacing machines, adapted to apply one or more streams of oxidizing gas, such as oxygen, and preferably preheating flames, obliquely against and along the surfaces of a metal body to remove thermochemically a relatively shallow layer of surface metal containing such defects, have been used for conditioning ferrous metal bodies. Such machines, especially when adapted to condition simultaneously all of the longitudinal surfaces of a metal body, have been constructed and arranged to condition bodies of the same cross-sectional size and have not been adapted nor intended to condition successive bodies of different sizes. If such a machine were to be used for successively desurfacing bodies of different sizes, considerable time and labor would be wasted in reconstructing the machine every time a change of cross-sectional size occurs in the bodies which undergo desurfacing.

The present invention provides an improved machine for simultaneously conditioning all four longitudinal surfaces of a ferrous metal body. The blowpipe heads or conditioning heads are adjustable toward and away from the center of the enclosed area for positioning the heads to condition successive bodies of different cross-sectional dimensions. Bodies of different sizes can be readily desurfaced successively without substantial loss of time.

It is an object of this invention to provide an improved surface conditioning apparatus: to provide such an apparatus which is readily adjustable for simultaneously conditioning all of the longitudinal surfaces of successive ferrous metal bodies of different or of the same cross-sectional dimensions; to provide such an apparatus including four conditioning heads for simultaneously conditioning the four sides of a rectangular ferrous metal body and means movably supporting such heads for centering them about and adjacent the sides of the body in accordance with the size of the body; to provide such an apparatus wherein each conditioning head is separately movable toward and away from the center of the opening between the heads and in a direction at an angle of 45° to the corresponding surface; to provide such an apparatus wherein the heads are also universally adjustable in a transverse plane; and to provide such apparatus which shall be of rugged construction and be readily operable.

These and other objects and novel features will become more apparent from the following description and the accompanying drawing, in which:

Fig. 1 is a schematic isometric view of a desurfacing machine embodying the principles of the present invention;

Fig. 2 is a schematic plan view of the machine of Fig. 1 where portions have been removed to more clearly show the means for supporting the desurfacing heads;

Fig. 3 is a schematic front elevation of the desurfacing heads positioned about a smaller billet; and, Fig. 4 is a schematic view, similar to Fig. 3, showing the desurfacing heads positioned about another rectangular steel body of a different size.

Referring to the drawing, the desurfacing machine M may be mounted on a suitable foundation or may be mounted on a motor-driven carriage for transverse movement into and out of alignment with the path of movement of the ferrous metal shapes, such as steel billets. The billet, such as a billet B, is preferably supported by and longitudinally propelled along a motor-driven roll table conveyor such as is usually employed in steel mills for conveying steel bodies from one operation to another. The roll table conveyor is not shown for the purposes of greater clarity in the drawing.

The desurfacing machine M includes two, similar desurfacing units E and F. The unit E includes two blowpipe heads 20 and 21 and the unit F includes two blowpipe heads 22 and 23. The blowpipe heads are similar and each preferably includes a nozzle block 25 adapted to operatively receive and removably retain a row of nozzles N and includes a nozzle protecting shoe 26. The nozzle blocks 25 contain suitable passages for supplying both an oxidizing gas, such as oxygen, and a combustible gas mixture, such as a mixture of acetylene and oxygen, to the nozzles N. Each nozzle N contains a central, longitudinal passage for discharging a jet of oxygen obliquely against and along the corresponding surface of the billet B and preferably contains a plurality of annularly disposed combustible gas passages for directing preheating flames obliquely against and along the corresponding surface. The nozzles of each head are so spaced that the individual oxygen jets blend to form a substantially sheet-like stream for removing a relatively shallow layer of surface metal substantially uniform in depth. Means are provided for supplying oxygen, preheating gases and preferably cooling water to each of the heads. Such means is schematically shown at 28 for the head 20. Valves are also preferably provided for controlling the flow of gases to the individual nozzles N so that the width of the gas stream can be varied according to the width of the corresponding surface. The heads 20, 21, 22, and 23 and the means for supplying gases to each of these heads may be of any suitable type or may be similar to or the same as the heads and gas supplying means shown in the copending United States patent application Serial No. 334,510, filed May 11, 1940, by A. M. Keller et al.

The coplanar blowpipe heads are similarly supported for inter-dependent adjustment in unison toward and away from the center of the area enclosed by the heads, and the means for supporting and inter-dependently moving each head will only be described in detail for one head. Head 21 is fastened by suitable means, such as bolts, to a separate carrier plate 31. The plate 31 is pivotally connected to the outer ends of two pairs of links 32 which are pivotally mounted on a transversely, horizontally movable or adjustable plate 34 which also similarly supports the head 20. A hydraulic cylinder 35 is pivotally connected to the plate 34 at 36 and the outer end of the piston 37 is pivotally connected to a rearwardly projecting finger 38 of the plate 31. Thus, when air or fluid is admitted under pressure to the rod end of the cylinder 35 the head 21 is moved upwardly and outwardly away from the center of the enclosed area and in a direction at 45° to the corresponding surface of the billet or at 45° to either a horizonal or vertical plane. When the pressure is released or reduced in the rod end of the cylinder 35 the head 21 moves into contact with the billet. By maintaining a predetermined minimum pressure in the rod end of the cylinder 35 the head 21 is partially counterbalanced and the pressure of the shoe 26 against the billet surface is the desired predetermined pressure.

Each of the heads 20, 21, 22, and 23 is similarly supported and is interdependently movable toward and away from the longitudinal center of the billet B and in a direction at 45° to the corresponding surface. The head 20, for instance, tends to move downward under the influence of gravity and fluid or gas must be admitted at the rod end of the cylinder 35 to move the head 20 into contact with the billet. The fluid or gas pressure is preferably so maintained in each of the cylinders 35 that each head is urged against the billet at a predetermined substantially equal pressure.

Thus, the heads can be moved inwardly, preferably in unison, to desurface the longitudinal surfaces of a smaller billet B', such as is shown in Fig. 3 or can be moved outwardly to desurface a larger billet. The heads are, in effect, given a semi-rotational movement in unison, either in a clockwise or anti-clockwise direction, to symmetrically enlarge or reduce the size or dimensions of the opening or passage between the heads so that the heads can be readily positioned for desurfacing successive square bodies of different sizes. As shown in Fig. 1, each of the heads is movable in a direction at 45° to the corresponding surface and in a direction substantially perpendicular to the directions of movement of the two adjacent heads so that each head when moved inwardly or outwardly, is moved transversely of the corresponding surface, and, a similar end 39 of each head is always maintained substantially flush with an adjacent edge of the corresponding surface and is always maintained inside of the head adjacent to the end 39. When adjusting the heads to accommodate different sizes of bodies, each head is moved toward and away from the central portion of the opening and in a direction similarly oblique to the corresponding longitudinal surface and substantially parallel to a bisector of the angle formed at the corner of the opening adjacent its similar end.

The desurfacing units E and F are supported by a plate 40 and each plate 34 is independently horizontally slidable along ways 41 on the plate 40. A cylinder 43 is connected at 44 to plate 40 and the outer end of the piston rod of cylinder 43 is connected to the back of the plate 34. A second cylinder 43 is similarly connected between the plate 40 and the lower plate 34. Thus, when fluid or gas under pressure is admitted to the head ends of cylinders 43 the units E and F are moved horizontally away from the billet B and when fluid or gas is admitted under pressure to the rod ends of the cylinders 43, the desurfacing units are moved toward the billet. During desurfacing, it is preferable that a predetermined pressure be maintained in the rod ends of cylinder 43 to urge the units E and F towards each other and into contact with the billet. Unit F is similarly supported and movable.

As the units E and F are horizontally movable or adjustable toward and away from each other and toward and away from the center of the enclosed area, rectangular and multi-sided bodies of different cross-sectional dimensions and each having longitudinal surfaces of different widths can be desurfaced in addition to square and multi-sided bodies of different sizes each of which has longitudinal surfaces of equal widths. In Fig. 4, the desurfacing heads are shown positioned for desurfacing a rectangular body such as a steel slab S.

The plate 40 is pivotally connected to the outer ends of a pair of horizontal links 45 which are pivotally connected to the back plate 46. A hydraulic counterbalancing cylinder H or other suitable counterbalancing means, preferably is mounted on cross-member 42 of the machine M and the piston rod 47 of cylinder H is connected to a boss on plate 40 to counterbalance the desurfacing apparatus so that the plate 40 and the attached apparatus can freely float vertically.

The bottom surfaces of all of the steel bodies moving along the conveyor are at the same level as all of the bodies rest on the top of the roll table. When a vertically thinner or thicker steel shape is to be conditioned, the level of the center of the steel shape shifts downwardly or upwardly. When a steel shape of different vertical thickness is to be desurfaced, the plate 40 and the attached desurfacing apparatus must shift vertically so that the center of the area enclosed by the heads will correspond or be in alignment with the longitudinal axis of the body.

The back plate 46 is pivotally connected at each end to a link 48 which is pivotally connected to the corresponding column 48' so that the plates 40 and 46 can float horizontally. Thus, the plate 40 is universally movable in a vertical transverse plane.

Often when steel shapes of different sizes are moved along the roll table, the left side 50 of the steel shape is maintained against and in alignment with a fixed guide so that when the sizes vary, the center of the area enclosed by the heads must shift transversely and this is compensated for by the transversely movable plate 40. When the lower left-hand corner of the steel shape is in the same position regardless of the size of the steel shape, the bottom is always in the same relative position as can be seen by referring to Figs. 3 and 4. The universal movement of plate 40 allows the heads to center themselves about the workpiece. Additionally, the universally movable plate 40 enables the heads to follow and remain in contact with the steel shape despite irregularities such as bends in the workpiece.

The desurfacing machine M is preferably controlled from a remote control table located out of the high temperature zone. The control means may be any suitable type or may be similar to or the same as the control system described and claimed in the patent application Serial No. 272,555, filed May 9, 1939, by J. H. Bucknam.

When a body is not being desurfaced, the heads preferably are all moved outwardly away from the common center along the diagonals and the units E and F are moved outwardly away from each other. Before a body is desurfaced, suitable valves (not shown) are manipulated to cut in or out the correct number of nozzles in each head so that each desurfacing head will discharge a composite oxygen stream substantially equal in width to the corresponding longitudinal surface.

When a ferrous metal body is to be desurfaced, the body is moved along the roll table until the starting end is in position and movement of the body is stopped. Gas or fluid is either admitted to or released from each of the cylinders 35 to simultaneously move each of the heads toward the body and simultaneously fluid or gas is admitted to the cylinders 43 to move the units E and F toward the body. The force exerted by each of the cylinders 35 and 43 is such that each head moves into contact with the body and the heads center themselves around the body so as to enclose an area of the same size as the body. If the body is not at the oxygen ignition temperature, the preheat flames are turned on, and after a short pause for preheating, the desurfacing oxygen is turned on and simultaneously the roll table conveyor is started to longitudinally propel the body past the desurfacing heads. The preheating flames preferably but not necessarily are left on to aid in more efficiently removing surface metal. After the body is desurfaced, the gases are shut off and the heads are preferably withdrawn or moved outwardly. If the next body to be desurfaced has different cross-sectional dimensions, the heads may, in effect, readily and interdependently be moved toward and away from a common center so that the heads will enclose an area of the same shape as the cross-sectional area of the body.

Having described this embodiment of the invention in detail, it is obvious that changes can be made in the apparatus shown and described and that features of the apparatus can be used alone or in different combinations without departing from the spirit or scope of the invention.

Flame discharging heads could be substituted for the desurfacing heads for thermally removing scale from metal bodies. It is also contemplated that the plate 40 could be mounted in a fixed position; or that the plate 40 could be supported for vertical movement only; or that the plates 31 and links 32 could be mounted directly on the plate 40 for conditioning successive square bodies of different sizes.

What is claimed is:

1. In a resurfacing machine for conditioning successive, rectangular, ferrous metal bodies of different and/or the same cross-sectional dimensions, the combination of four desurfacing heads, each of said heads being adapted for positioning adjacent a corresponding longitudinal surface of a body to be desurfaced and being substantially as wide as the widest such corresponding surface; means supporting said heads for movement of each of said heads in a direction at 45° to the corresponding surface of such a body and in a direction substantially perpendicular to the directions of movement of the two adjacent heads; and means for resiliently urging each of said heads inwardly whereby the area enclosed by said heads is varied in accordance with the cross-sectional area of said body.

2. In a machine for simultaneously surface conditioning at least two adjacent longitudinal surfaces of each of a succession of ferrous metal bodies having the same or different cross-sectional dimensions, said two surfaces being at about 90° to each other, the combination of two conditioning heads, each of said heads being adapted to apply a gaseous stream against and along a corresponding one of said longitudinal surfaces of such a body when supported in an operative position adjacent said corresponding surface; and separate mechanisms supporting each of said heads for movement in a similar direction, the direction of movement of each of said heads being at an angle of 45° to the corresponding surface and in a direction substantially perpendicular to the direction of movement of the other one of said heads.

3. Apparatus for simultaneously desurfacing the four longitudinal surfaces of each of a succession of rectangular ferrous metal bodies of different and the same transverse dimensions, said apparatus comprising in combination, four substantially coplanar desurfacing heads adapted to enclose a passage of substantially the same transverse dimensions as the transverse cross-sectional dimensions of the body to be desurfaced; means for supporting and longitudinally propelling such a body through said passage; a member supporting said heads for vertical and horizontal transverse movement to align said passage with said body; two plates for supporting said heads in pairs, said plates being mounted on said member for transverse movement toward and away from the center of said passage; and a parallelogram linkage mechanism separately supporting each of said heads on one of said plates for movement toward and away from the center of said passage in a direction at 45° to the corresponding side of said passage and in a direction perpendicular to the directions of movement of the two adjacent heads, whereby the transverse dimensions of said passage are varied in accordance with the transverse dimensions of said body.

4. In a surface conditioning machine for simultaneously conditioning the longitudinal surfaces of an elongated multi-sided ferrous metal body when propelled in the direction of its length, the combination comprising a plurality of conditioning heads equal in number to the number of said longitudinal surfaces to be conditioned, each of said heads being adapted to be disposed in an operative position adjacent a corresponding longitudinal surface of said body with a similar end of each head inside the head adjacent said similar end to define an opening of substantially the same dimensions as the dimensions of a cross section of said body; means for longitudinally propelling said body through said opening for conditioning said body; and means for supporting said heads in said operative positions, said supporting means including mechanisms supporting each of said heads for movement toward and away from the central portion of said opening and each in a direction similarly oblique to the corresponding longitudinal surface and substantially parallel to a bisector of the angle formed at the corner of said opening adjacent said similar end of each head whereby the size of said opening is variable according to the size of said body.

5. A surface conditioning machine for simultaneously conditioning the longitudinal surfaces of an elongated rectangular ferrous metal body when propelled in the direction of its length, such machine comprising, in combination, four conditioning heads adapted to be disposed in operative positions adjacent said longitudinal surfaces with a similar end of each head inside the head adjacent said similar end to enclose an opening of substantially the same dimensions, as the dimensions of a cross-section of said body; means for longitudinally propelling said body through said opening for conditioning said body; and means for supporting said heads in said operative positions, said supporting means including mechanism supporting each of said heads for movement toward and away from the center of said opening in a direction at an angle of substantially 45° to the corresponding one of said longitudinal surfaces and substantially perpendicular to the directions of movement of the two adjacent heads whereby the size of said opening is variable according to the size of said body.

6. Apparatus for simultaneously conditioning the four longitudinal surfaces of each of a succession of rectangular, elongated ferrous metal bodies having the same and/or different transverse dimensions, such apparatus comprising, in combination, four conditioning heads, each of said heads being adapted to apply a gaseous stream against a corresponding one of the longitudinal surfaces of such a body and said heads being adapted to enclose a rectangular passage when supported in operative positions adjacent said corresponding surfaces; means for longitudinally propelling said body through said passage for conditioning; and mechanism for supporting said heads in said operative positions adjacent said body with a similar end of each head inside of the head adjacent said end and for moving each of said heads toward and away from the center of said passage in a direction at an angle of 45° to its said corresponding surface and in a direction substantially perpendicular to the directions of movement of the two adjacent heads, whereby the transverse dimensions of the passage enclosed by said heads are equally varied in accordance with the transverse dimensions of said body.

7. Surface conditioning apparatus as claimed in claim 6 in which said heads are supported in pairs, and which includes means for additionally transversely moving said pairs toward and away from each other and the center of said passage, whereby the transverse dimensions of said passage may be unequally varied in accordance with the transverse dimensions of said body.

8. In a machine for simultaneously surface conditioning at least two angularly related contiguous longitudinal surfaces of each of a succession of ferrous metal bodies having the same or different cross-sectional dimensions, the combination comprising two conditioning heads, each of said heads being adapted to apply a gaseous stream against a zone extending across a corresponding one of said longitudinal surfaces when supported in an operative position adjacent such longitudinal surface; and separate mechanisms supporting each of said heads for movement at an oblique angle with respect to the corresponding surface, the direction of movement of one of said heads being substantially parallel to a bisector of the angle between said two longitudinal surfaces and the direction of movement of the second of said two heads being substantially parallel to a bisector of the angle between the longitudinal surface adjacent said second head and a third longitudinal surface of the body contiguous to the surface adjacent said second head, whereby said heads are movable inwardly or outwardly with respect to the body.

9. In a desurfacing machine for conditioning succesive, rectangular, ferrous metal bodies of different and/or the same cross-sectional dimensions, the combination of four desurfacing heads, each of said heads being adapted for positioning adjacent a corresponding longitudinal surface of a body to be desurfaced and being substantially as wide as the widest such corresponding surface; means supporting said heads for movement of each of said heads in a direction at 45° to the corresponding surface of such a body and in a direction substantially perpendicular to the directions of movement of the two adjacent heads, and means for continuously resiliently urging each of said heads inwardly before and during conditioning operations whereby the area enclosed by said heads is varied in accordance with the cross-sectional area of said body.

RUDOLPH CHELBORG.